United States Patent
Kamath et al.

(10) Patent No.: US 9,971,808 B2
(45) Date of Patent: *May 15, 2018

(54) FAST QUERY PROCESSING IN COLUMNAR DATABASES WITH GPUS

(71) Applicant: International Business Machines Corporation, Armonk, NY (US)

(72) Inventors: Sunil J. Kamath, Markham (CA); Kajatheepan Kanagaratnam, Toronto (CA); John D. Keenleyside, Aurora (CA); Seyed Sina Meraji, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 14/748,838

(22) Filed: Jun. 24, 2015

(65) Prior Publication Data

US 2016/0378751 A1    Dec. 29, 2016

(51) Int. Cl.
    *G06F 17/30*    (2006.01)

(52) U.S. Cl.
    CPC .. *G06F 17/30477* (2013.01); *G06F 17/30315* (2013.01)

(58) Field of Classification Search
    CPC ..................... G06F 17/30477; G06F 17/30315
    See application file for complete search history.

(56) References Cited

U.S. PATENT DOCUMENTS

| | | | |
|---|---|---|---|
| 8,626,725 B2 | 1/2014 | Netz et al. | |
| 8,660,985 B2 | 2/2014 | Wang et al. | |
| 8,762,366 B1 | 6/2014 | Becerra et al. | |
| 8,762,407 B2 | 6/2014 | Wang et al. | |
| 2011/0202745 A1 | 8/2011 | Bordawekar et al. | |
| 2013/0141444 A1 | 6/2013 | Gautam et al. | |
| 2014/0052726 A1 | 2/2014 | Amberg et al. | |
| 2014/0330801 A1 | 11/2014 | Kaldewey et al. | |
| 2014/0379985 A1 | 12/2014 | Barber et al. | |

OTHER PUBLICATIONS

Alcantara, Efficient Hash Table on the GPU, 2011, 133 pages.*

(Continued)

*Primary Examiner* — Albert M Phillips, III
(74) *Attorney, Agent, or Firm* — Robert C. Bunker (57) ABSTRACT

According to one exemplary embodiment, a method for processing a query associated with a database is provided. The method may include receiving the query. The method may include estimating a number of groups. The method may include copying a plurality of data from the database to graphics processing unit (GPU) memory. The method may include creating a hash table in GPU memory. The method may include determining if a group associated with the database is present in the hash table. The method may include adding the group to the hash table based on determining that the group is not present in the hash table. The method may include aggregating a value associated with the group in the hash table based on determining that the group is present in the hash table. The method may include determining a plurality of results. The method may then include retrieving the plurality of results.

5 Claims, 6 Drawing Sheets

(56) References Cited

OTHER PUBLICATIONS

Gandham, A GPU accelerated aggregation algebraic multigrid method, 2014, pp. 1151-1160.*
Neele, Design of a Scalable Hash Table on a GPU, 2014, 4 pages.*
Costa, GPU Support for Batch Oriented Workloads, 2009, pp. 231-238.*
Meraji et al., Towards a Combined Grouping and Aggregation Algorithm for Fast Query Processing in Columnar Databases with GPUs, May 2015, pp. 594-603.*
Bakkum, Accelerating SQL Database Operations on a GPU with CUDA, 2010, pp. 94-103.*
IBM, "List of IBM Patents or Patent Applications Treated as Related (Appendix P)," Aug. 1, 2016, p. 1-2.
Kamath et al., "Fast Query Processing in Columnar Databases with GPUs," Application and Drawings, Filed on Jun. 28, 2016, 29 Pages, U.S. Appl. No. 15/194,621.
Barber et al., "Accurate Partition Sizing for Memory Efficient Reduction Operations," Filed on Aug. 1, 2014, p. 1-28, U.S. Appl. No. 14/449,337.
Färber et al., "The SAP HANA Database—An Architecture Overview," Bulletin of the IEEE Computer Society Technical Committee on Data Engineering, 2012, p. 1-6.
Mell et al., "The NIST Definition of Cloud Computing," National Institute of Standards and Technology, Sep. 2011, p. 1-3, Special Publication 800-145.
Raman et al., "DB2 with BLU Acceleration: So Much More than Just a Column Store," Proceedings of the VLDB Endowment, 2013, p. 1080-1091, vol. 6, No. 11.

* cited by examiner

FAST QUERY PROCESSING IN COLUMNAR DATABASES WITH GPUS

BACKGROUND

The present invention relates generally to the field of computing, and more particularly to group by/aggregate query processing in databases.

Columnar databases are being used with increased frequency due to fast query processing response times on modern multi-core computers. Among database operations that are used, group by/aggregate queries are an important, and potentially costly, operation to process.

SUMMARY

According to one exemplary embodiment, a method for processing a query associated with a database is provided. The method may include receiving the query. The method may also include estimating a number of groups based on the received query and the database. The method may then include copying a plurality of data from the database to graphics processing unit (GPU) memory associated with a GPU. The method may further include creating a global hash table in GPU memory based on the estimated number of groups. The method may also include determining if a group associated with the database is present in the global hash table. The method may then include adding the group to the global hash table based on determining that the group is not present in the global hash table. The method may further include aggregating a value associated with the group in the global hash table based on determining that the group is present in the global hash table. The method may also include determining a plurality of results based on the received query and the global hash table. The method may then include retrieving the determined plurality of results.

According to another exemplary embodiment, a computer system for processing a query associated with a database is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the query. The method may also include estimating a number of groups based on the received query and the database. The method may then include copying a plurality of data from the database to graphics processing unit (GPU) memory associated with a GPU. The method may further include creating a global hash table in GPU memory based on the estimated number of groups. The method may also include determining if a group associated with the database is present in the global hash table. The method may then include adding the group to the global hash table based on determining that the group is not present in the global hash table. The method may further include aggregating a value associated with the group in the global hash table based on determining that the group is present in the global hash table. The method may also include determining a plurality of results based on the received query and the global hash table. The method may then include retrieving the determined plurality of results.

According to yet another exemplary embodiment, a computer program product for processing a query associated with a database is provided. The computer program product may include one or more computer-readable storage devices and program instructions stored on at least one of the one or more tangible storage devices, the program instructions executable by a processor. The computer program product may include program instructions to receive the query. The computer program product may also include program instructions to estimate a number of groups based on the received query and the database. The computer program product may then include program instructions to copy a plurality of data from the database to graphics processing unit (GPU) memory associated with a GPU. The computer program product may further include program instructions to create a global hash table in GPU memory based on the estimated number of groups. The computer program product may also include program instructions to determine if a group associated with the database is present in the global hash table. The computer program product may then include program instructions to add the group to the global hash table based on determining that the group is not present in the global hash table. The computer program product may further include program instructions to aggregate a value associated with the group in the global hash table based on determining that the group is present in the global hash table. The computer program product may also include program instructions to determine a plurality of results based on the received query and the global hash table. The computer program product may then include program instructions to retrieve the determined plurality of results.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for group by/aggregate query processing in columnar databases using a graphics processing unit (GPU). As such, the present embodiment has the capacity to improve the technical field of group by/aggregate query processing in columnar databases by utilizing the parallel processing abilities of a GPU to process group by/aggregate queries. More specifically, tuples from a columnar database may be copied to the GPU's memory and a global hash table may be generated. Database groups may then be inserted into the hash table in parallel and when a thread determines that a group already exists in the hash table, the thread may aggregate data to the existing group.

As described previously, columnar databases are being used with increased frequency due to fast query processing response times on modern multi-core computers. Among database operations that are used, group by/aggregate queries are important and potentially a costly operation to process. Many computing devices (e.g., servers, computers, etc.) that perform group by/aggregate query processing also include a graphics processing unit (GPU) capable of parallel processing that is unused in group by/aggregate query processing.

Therefore, it may be advantageous to, among other things, provide a way to utilize a GPU's parallel processing capabilities to perform faster group by/aggregate query processing in columnar databases.

According to at least one embodiment, database data may be transferred to the graphics processing unit (GPU) where the group by/aggregate query processing occurs (i.e., by running a group by/aggregate kernel) and then the results may be transferred to the central processing unit (CPU). The group by/aggregate kernel processes in parallel group generation and aggregation that may be stored in a hash table in GPU memory. Thereafter, a probe operation may be performed on the hash table to retrieve the groups.

During hash table creation, coalesced reads of the input data may be performed. Each thread of the GPU analyzes a specific row from the database data stored in GPU memory. Aggregation occurs during hash table creation as parallel threads determine that a group corresponding the row data the thread is attempting to input already exists in the hash table and thus the thread may then aggregate the data with the existing group in the hash table. Aggregation may be performed using the desired aggregation operation (e.g., sum, count, etc.) indicated in the input aggregate query. After the hash table is created, the table may be probed to retrieve the result without further processing (i.e., entries within the hash table are read and if the entries are not empty, the entries may be copied as the output result).

The bandwidth for device memory in modern GPUs can be very high (e.g., 280 GB/s) with coalesced reads/writes. Furthermore, thousands of parallel threads may be launched to probe a hash table by looking at coalesced locations in parallel that may result in high performance table probing. However, in scenarios with a small number of groups selected in the group by query, many GPU atomic operations may be performed on the same location that may lead to stalled threads within the GPU. This may be overcome by using the GPU's shared memory to aggregate the results when the number of groups is small or data is skewed in such a way that certain groups have more members than others. Atomic operations on GPU shared memory may be much faster than atomic operations on global GPU memory locations. Hence, automatic performance tuning of the group by/aggregate queries may be made based on the estimated number of groups. Users may write queries intended to use a small number of groups since the results need to be readable by a human user (i.e., a user may not be likely to write a query that would result in millions of groups being returned since it is not practical for a human to derive meaningful information from such a large result). Therefore, by identifying that the number of groups in the query is small, query processing may be optimized by utilizing the limited amounts of fast GPU shared memory available.

Figure 1:
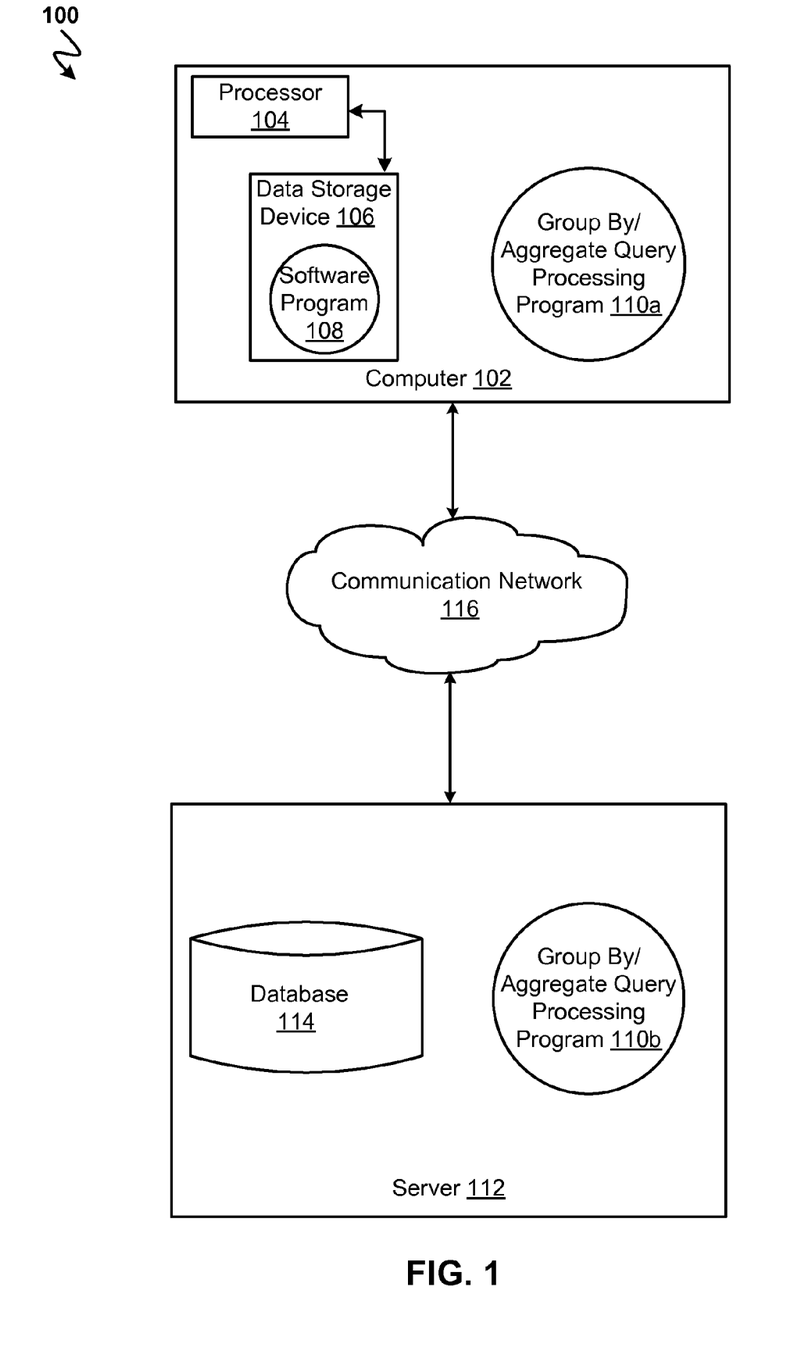
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a group by/aggregate query processing program 110a. The networked computer environment 100 may also include a server 112 that is enabled to run a group by/aggregate query processing program 110b that may interact with a database 114 and a communication network 116. The networked computer environment 100 may include a plurality of computers 102 and servers 112, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the group by/aggregate query processing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the group by/aggregate query processing program 110a, 110b (respectively) to process expensive group by/aggregate queries quickly using a graphics processing unit (GPU). The group by/aggregate query processing method is explained in more detail below with respect to FIGS. 2 and 3.

Figure 2:
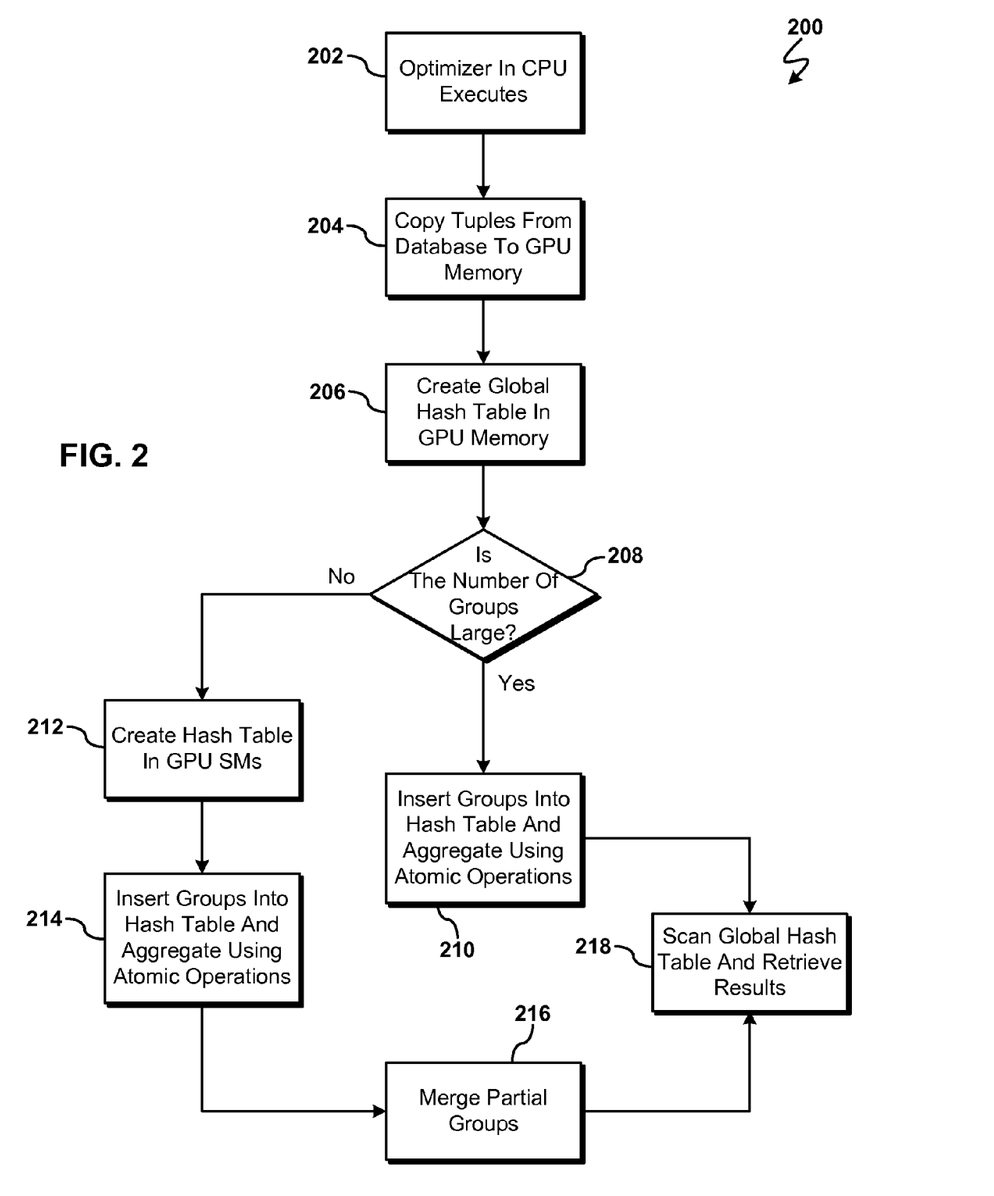
FIG. 2 is an operational flow chart illustrating a process for group by/aggregate query processing using a graphics processing unit (GPU) according to at least one embodiment.

Referring now to FIG. 2, an operational flow chart illustrating the steps 200 used by an algorithm to process group by/aggregate queries utilizing a GPU according to at least one embodiment is depicted.

At 202, an optimizer in the central processing unit (CPU) executes on an input group by/aggregate query. According to at least one embodiment, the input group by/aggregate query has been separated from any additional query parts (i.e., queries that are not part of the group by/aggregate query, such as a join query) and received as input at 202. Database management systems may use a known optimizer algorithm in the CPU to optimize the received query by generating an execution plan for processing the query. Additionally, the optimizer may estimate the number of groups that may be needed to process the group by/aggregate query as the optimizer analyzes the input query and generates the execution plan. The estimated number of groups may then be stored in a data repository, such as a database 114 (FIG. 1).

Next, at 204, data tuples from the queried database are copied from the database 114 (FIG. 1) to GPU memory. According to at least one embodiment, the queried database may be stored in a hard drive or computer system memory. Tuples of columnar data (in the case of columnar databases) may then be copied from the queried database to GPU memory for query processing.

Then, at 206, a global hash table is created in the GPU's memory. According to at least one embodiment, the size of the created global hash table is set based on the estimated number of groups that was determined by the optimizer algorithm at 202. The estimated number of groups may be read from a data repository and used to initialize the hash table size to be able to accommodate the estimated number of groups. For example, based on the estimated number of groups (e.g., 15 groups), the hash table may be initialized to be 10% more than the estimated number of groups to handle instances when the estimation is low, yet still not inefficiently allocate excess memory by making the table too large.

At 208, it is determined if the estimated number of groups is sufficient to be classified as a large number of groups. According to at least one embodiment, a threshold value may be predefined (e.g., 2000 groups) to determine if a number of groups is considered large. According to at least one other embodiment, the threshold value may be defined based on the amount of shared memory the streaming multiprocessors (SMs) have within the GPU. According to at least one other embodiment, the threshold value may be determined based on the data type attribute that the group by/aggregate query is applied to (e.g., "date" type for dates, "INT" type for salaries, etc.), as larger data types may consume more memory. Additionally, the threshold value may be based on the number of aggregation functions (e.g., if the query indicates that a max/min/sum on three different columns is to be aggregated, shared memory may not be able to handle many groups). It may be appreciated that other ways, or a combination of ways, may be used to determine the threshold value. The estimated number of groups may be read and then compared with the threshold value in order to determine if the estimated number of groups is large.

If it is determined that the estimated number of groups does exceed the threshold value (i.e., the estimated number of groups is large) at 208, the groups are inserted into the global hash table in the GPU's memory using multiple execution threads and group values are aggregated using GPU atomic operations in parallel at 210. According to at least one embodiment, multiple GPU threads (e.g., 2880 threads in a GPU with 2880 cores) may read the tuple data stored in the GPU's memory in parallel to identify groups in the tuple data. After a thread identifies a group in the tuple data, the thread may then attempt to insert (i.e., add) the group to the global hash table stored in GPU memory. Groups may be inserted into the hash table using an atomic operation provided by the GPU.

For example, if the group by/aggregate query requests that employees in an employee database be grouped by birth month and aggregate a sum of salaries, a first thread may find an employee born in April with a salary of $20000. The first thread may then insert the group "April" into the hash table along with the value of $20000. A second thread may find an employee born in May with a salary of $65000 and insert the group "May" into the hash table along with the value of $65000.

As parallel threads attempt to add duplicate groups to the hash table, the parallel threads will determine that the group the thread is attempting to insert already exists in the hash table. According to at least one embodiment, once the thread determines that the group the thread is attempting to insert into the hash table already exists, the thread may then aggregate the value associated with the group the thread attempted to insert based on the input query (e.g., sum). The aggregation function may be handled by an atomic operation provided by the GPU.

Continuing the above example, a third thread may then find another employee born in April with a salary of $35000 and, when attempting to insert the group "April," determines that the group "April" already exists. The thread may then aggregate the value in the group "April" based on the query (e.g., sum). Thus, the third thread will calculate the sum of the value the thread is attempting to insert (i.e., $35000) and the value already existing in the hash table for the group (i.e., $20000). After aggregation by the third thread, the value in the hash table for the group "April" will become $55000 (i.e., $35000+$20000=$55000).

However, if it is determined that the estimated number of groups does not exceed the threshold value (i.e., the estimated number of groups is not large) at 208, multiple small hash tables are created in the shared memory of each of the stream multiprocessors (SMs) at 212. According to at least one embodiment, partitioning the hash table into multiple small hash tables is done based on the estimated number of groups. Parallel threads may create the small hash tables by reading input data concurrently. Each SM in the GPU may have shared memory associated with the SM. Therefore, multiple small hash tables may be created in each SM's shared memory. For example, a GPU may have twenty SMs each with its own shared memory. If the shared memory has ten small hash tables created, each of the twenty SMs will have ten small hash tables thus resulting in two hundred small hash tables in total.

Next, at 214, groups are inserted into the global hash table in the GPU's memory using multiple execution threads and group values are aggregated using GPU atomic operations in parallel. According to at least one embodiment, the number of execution threads may be partitioned and assigned to individual small hash tables in the SM's shared memory. For example, if there are 12 small hash tables in shared memory and 6000 execution threads available, then 500 execution threads may be assigned to each small hash table.

The partitioned execution threads may insert data into the small hash table that the thread is assigned. The small hash tables may then be populated by inserting groups and aggregating values in parallel as described previously with respect to step 214. However, since the data is spread between multiple small hash tables, each individual small hash table may only contain partial data (e.g., one small hash table may only contain the employee salaries for employees born in the months of "January," "May," and "June").

Then, at 216, the small hash tables in the SM's shared memory are merged and inserted into the global hash table. According to at least one embodiment, the partial data contained in each of the small hash tables may be merged and inserted into the global hash table stored in the GPU's memory.

For example, a first small hash table may contain employee salaries for employees born in the months of "January," "May," and "June." A second hash table may contain the employee salaries for employees born in the months of "May," "October," and "March." Other small hash tables may be contained in the shared memory of other SMs having other groups (i.e., months). The data stored in the small hash tables may then be merged into the global hash table to include salaries from all of the small hash tables. The first small hash table and the second small hash table both contain partially aggregated values for the group "May." Since a group may be present in more than one small hash table (thus a group in a small hash table may not have all of the aggregated values for that group), the data is merged using parallel threads and the GPU's atomic operations into the global hash table to handle data collisions. After merging, the groups in the global hash table contain the merged values from the one or more small hash tables that had partially aggregated data, the global hash table contains the complete aggregated group data.

Once the global hash table has been populated at 216 or 210, GPU execution threads probe the global hash table in parallel and retrieve the results to the input query at 218. According to at least one embodiment, the retrieved results are transferred back to the CPU.

Figure 3:
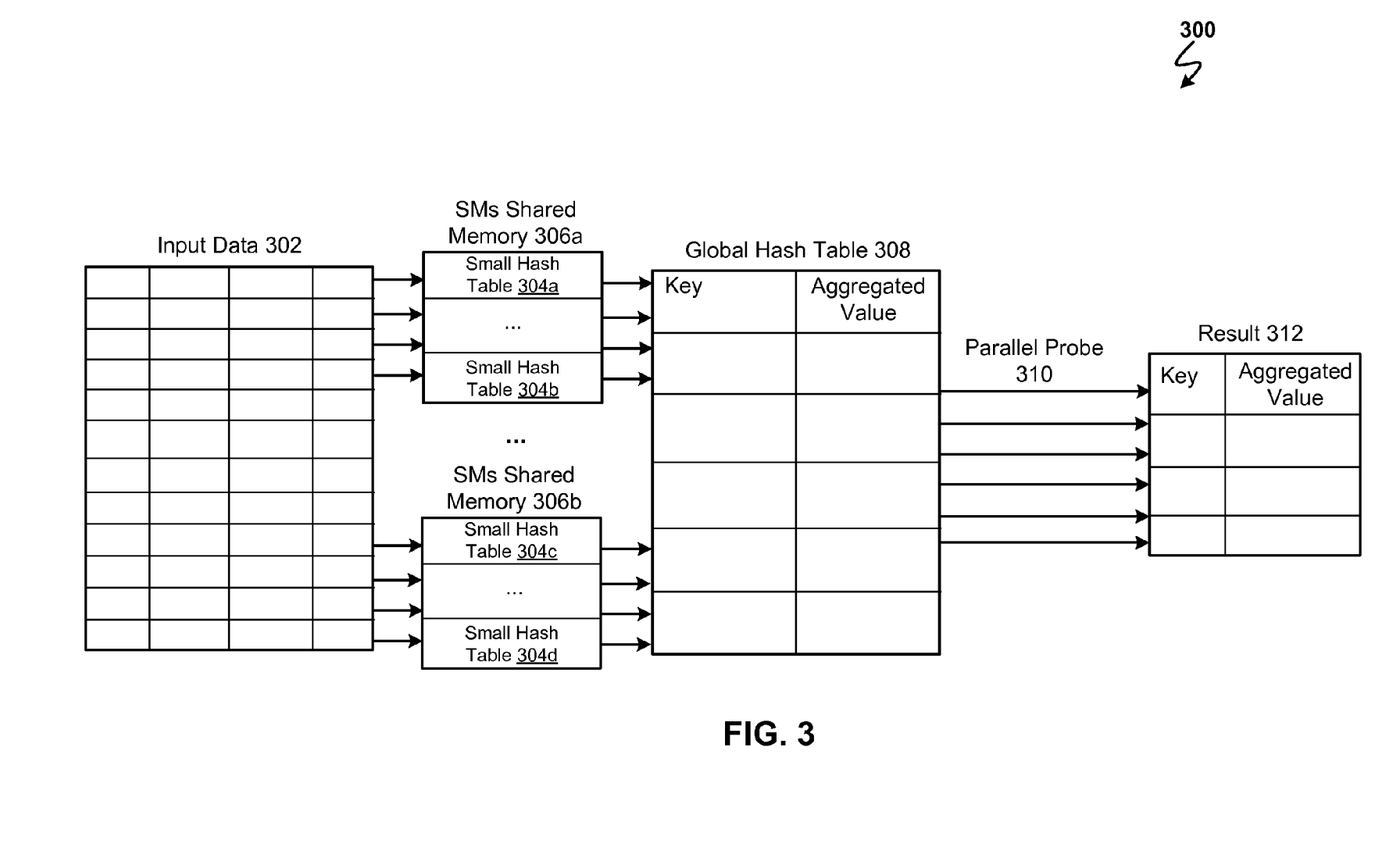
FIG. 3 is a flow diagram illustrating group by/aggregate query processing using a GPU for small group numbers according to at least one embodiment.

Referring now to FIG. 3, a flow diagram 300 illustrating group by/aggregate query processing using a GPU for a small number of groups according to at least one embodiment is depicted.

In the case when the estimated number of groups (based on the group by/aggregate query and input data 302) does not exceed the threshold value for a large group as previously described at 208 (FIG. 2), multiple small hash tables 304a-d are generated within shared memory 306a-b of each streaming multiprocessor (SM) by GPU execution threads in parallel, as previously described at step 212 (FIG. 2). First SM may have shared memory 306a with small hash tables 304a-b and second SM may have shared memory 306b with small hash tables 304c-d. Input data 302 is read by execution threads in parallel and inserted into small hash tables 304a-d. As described previously at 214 (FIG. 2), threads that determine that the small hash table (e.g., 304a) already contains the group the thread is attempting to insert will instead aggregate the value from the input data 302 to the value stored in the small hash table (e.g., 304a).

Then, data from small hash tables 304a-d are merged and inserted into the global hash table 308, as described previously at 216 (FIG. 2), using parallel threads. Thereafter, parallel probing 310 may be used to probe the global hash table 308 using GPU threads as described previously at 218 (FIG. 2). Additionally, the result 312 of parallel probing 310 may be retrieved to respond to the original input group by/aggregate query.

It may be appreciated that FIGS. 2 and 3 provide only an illustration of one embodiment and does not imply any limitations with regard to how different embodiments may be implemented. Many modifications to the depicted embodiment(s) may be made based on design and implementation requirements.

Figure 4:
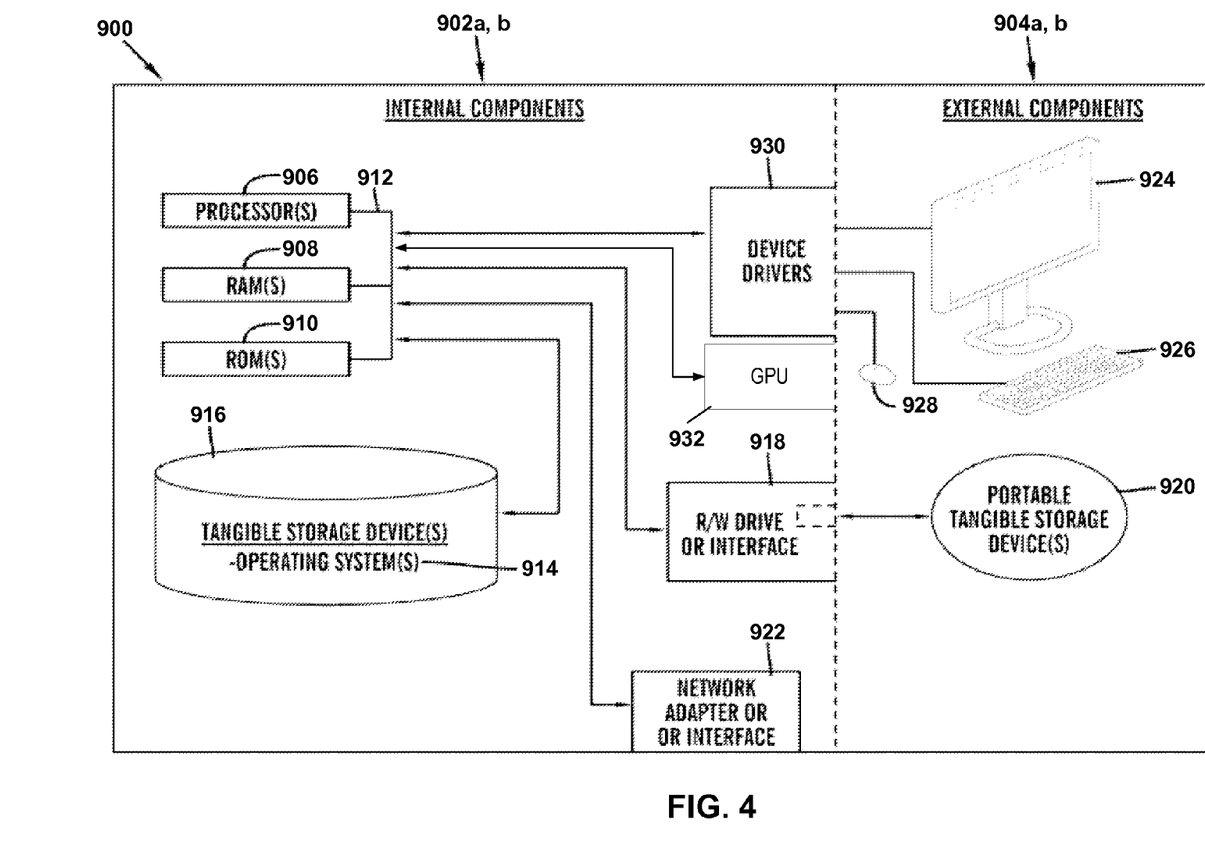
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, one or more graphics processing units (GPUs) 932, and one or more operating systems 914 and one or more computer-readable tangible storage devices 916. The one or more operating systems 914 and the software program 108 (FIG. 1) and the group by/aggregate query processing program 110a (FIG. 1) in client computer 102 (FIG. 1) and the group by/aggregate query processing program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the group by/aggregate query processing program 110a and 110b (FIG. 1) can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the group by/aggregate query processing program 110a (FIG. 1) in client computer 102 (FIG. 1) and the group by/aggregate query processing program 110b (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the group by/aggregate query processing program 110a (FIG. 1) in client computer 102 (FIG. 1) and the group by/aggregate query processing program 110b (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
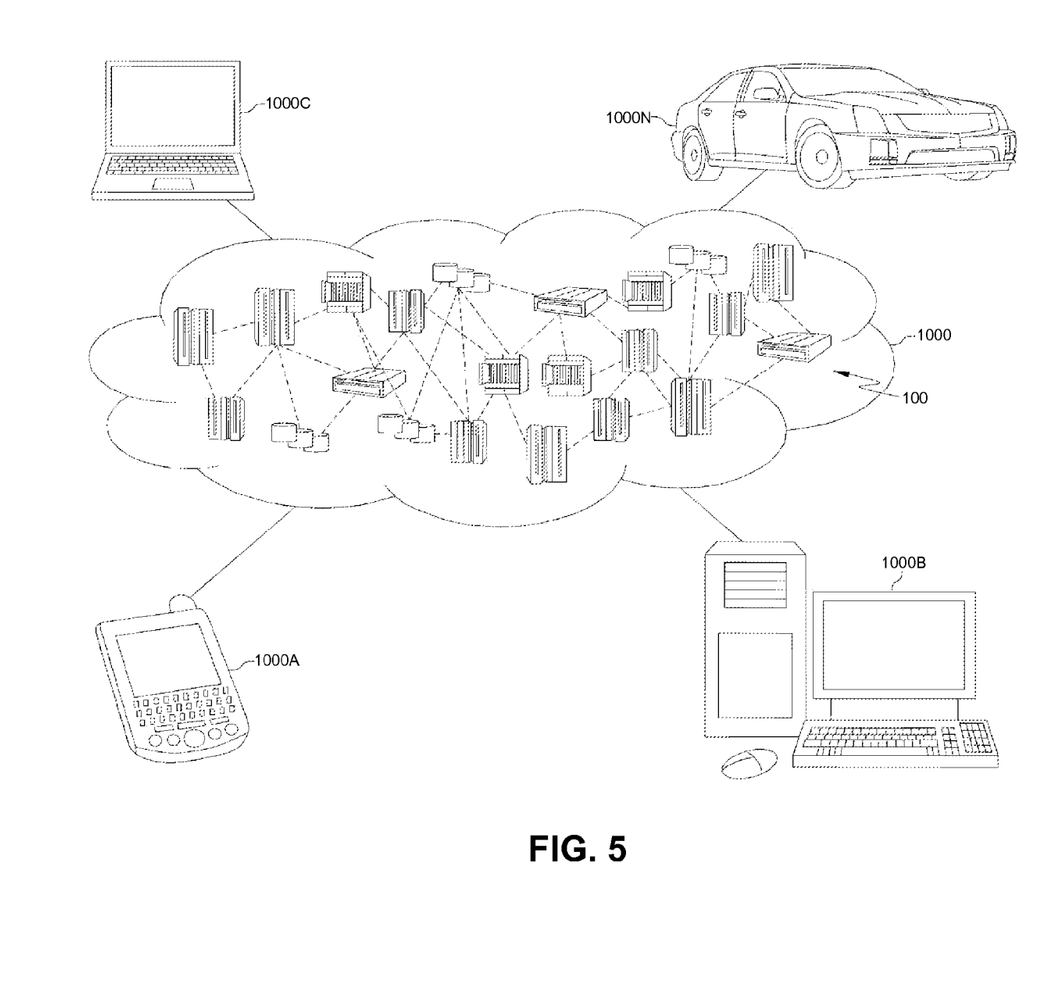
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
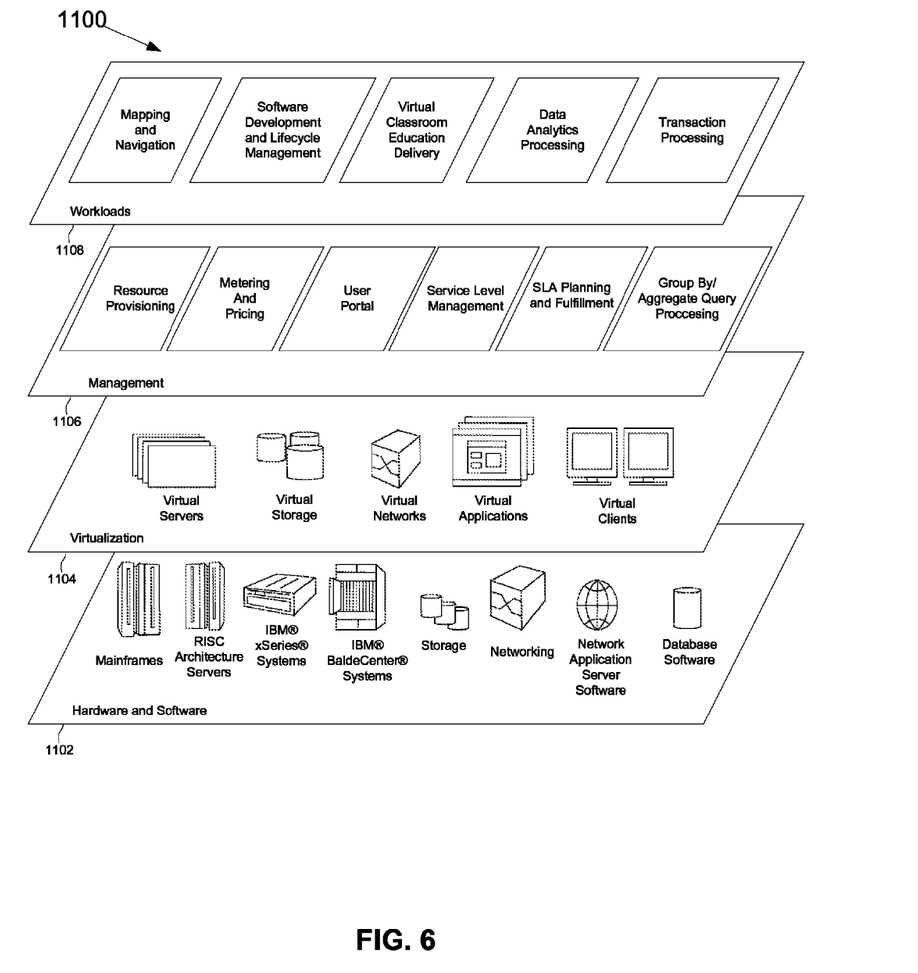
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes; RISC (Reduced Instruction Set Computer) architecture based servers; storage devices; networks and networking components. In some embodiments, software components include network application server software.

Virtualization layer 1104 provides an abstraction layer from which the following examples of virtual entities may be provided: virtual servers; virtual storage; virtual networks, including virtual private networks; virtual applications and operating systems; and virtual clients.

In one example, management layer 1106 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Group by/aggregate query processing provides a way to utilize the large core set available on graphics processing units (GPUs) to parallel process database group by/aggregate queries.

Workloads layer 1108 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a group by/aggregate query;
estimating a number of groups based on the received query and a database;
copying data tuples of columnar data from the database to graphics processing unit (GPU) memory associated with a GPU;
creating a global hash table in GPU memory based on the estimated number of groups;
determining a threshold value, wherein the threshold value is determined based on one or more of: a finite number, a data type attribute, and a number of aggregation functions, based on determining that the number of groups in the global hash table does not exceed the threshold value;
creating a plurality of hash tables in shared memory of stream multiprocessors;
inserting groups into the global hash table using a plurality of execution threads;
aggregating the group values using the GPU's atomic operations in parallel;
inserting data into each of the multiple hash tables via the multiple execution threads, wherein the inserting comprises creating partial data;
merging the multiple hash tables;
inserting the merged, multiple hash tables into the global hash table;
scanning the global hash table; and
retrieving a plurality of results.

2. The computer system of claim 1, wherein aggregating the group values is based on the received query.

3. The computer system of claim 1, wherein estimating the number of groups comprises using an optimizer executed in a central processing unit (CPU).

4. A non-transitory computer-readable medium storing instructions that, when executed by a computer, cause the computer to perform the method of:
receiving a group by/aggregate query;
estimating a number of groups based on the received query and a database;
copying data tuples of columnar data from the database to graphics processing unit (GPU) memory associated with a GPU;
creating a global hash table in GPU memory based on the estimated number of groups;
determining a threshold value, wherein the threshold value is determined based on one or more of: a finite number, a data type attribute, and a number of aggregation functions, based on determining that the number of groups in the global hash table does not exceed the threshold value;

creating a plurality of hash tables in shared memory of stream multiprocessors;
inserting groups into the global hash table using a plurality of execution threads;
aggregating the group values using the GPU's atomic operations in parallel;
inserting data into each of the multiple hash tables via the multiple execution threads, wherein the inserting comprises creating partial data;
merging the multiple hash tables;
inserting the merged, multiple hash tables into the global hash table;
scanning the global hash table; and
retrieving a plurality of results.

5. The non-transitory computer-readable medium of claim 4, wherein aggregating the group values is based on the received query.

* * * * *